United States Patent [19]

Premiski et al.

[11] Patent Number: 5,370,590

[45] Date of Patent: Dec. 6, 1994

[54] SECURING MEANS FOR A PLANETARY GEAR UNIT

[75] Inventors: Vladimir Premiski, Willerscheidt; Udo Schumann; Mark Silk, both of Cologne, all of Germany

[73] Assignee: Ford Motor Company, Dearborn, Mich.

[21] Appl. No.: 74,501

[22] Filed: Jun. 11, 1993

[30] Foreign Application Priority Data

Jul. 23, 1992 [DE] Germany .............. 4224331

[51] Int. Cl.$^5$ ............. F16H 1/28; F16H 3/44
[52] U.S. Cl. ................. 475/346; 475/347
[58] Field of Search ........... 475/347, 346, 331, 323; 403/409.1, 297, 154

[56] References Cited

U.S. PATENT DOCUMENTS 3,780,601 12/1973 Dach et al. ............... 475/331 X
5,328,419 7/1994 Motl et al. ............... 475/323 X

*Primary Examiner*—Charles A. Marmor
*Assistant Examiner*—Mary Ann Battista
*Attorney, Agent, or Firm*—Frank G. McKenzie; Roger L. May

[57] ABSTRACT

A means for securing a connection between a planetary gear unit including one or more planet gear sets and a drum member surrounding them, wherein the planet gear carrier (8) carrying the planet gears (10) rotatably mounted on planet gear spindles (9) includes a larger diameter disc member (14) connected to the open end of the drum member (16) by a projection and recess (17/18) connection. Connection is axially secured by a securing element (30) formed as a ring adjacent the disc member (14) and having at least two, and preferably three, pairs of spreading arms extending radially into the recesses (18) of the drum member (16). The recesses (18) are provided with grooves (19) located in front of the plane of the disc member (14). The end edges (36) of the radial spreading arms (32) are engageable in the grooves (19) in the circumferential direction by plastic or elastic deformation.

8 Claims, 3 Drawing Sheets

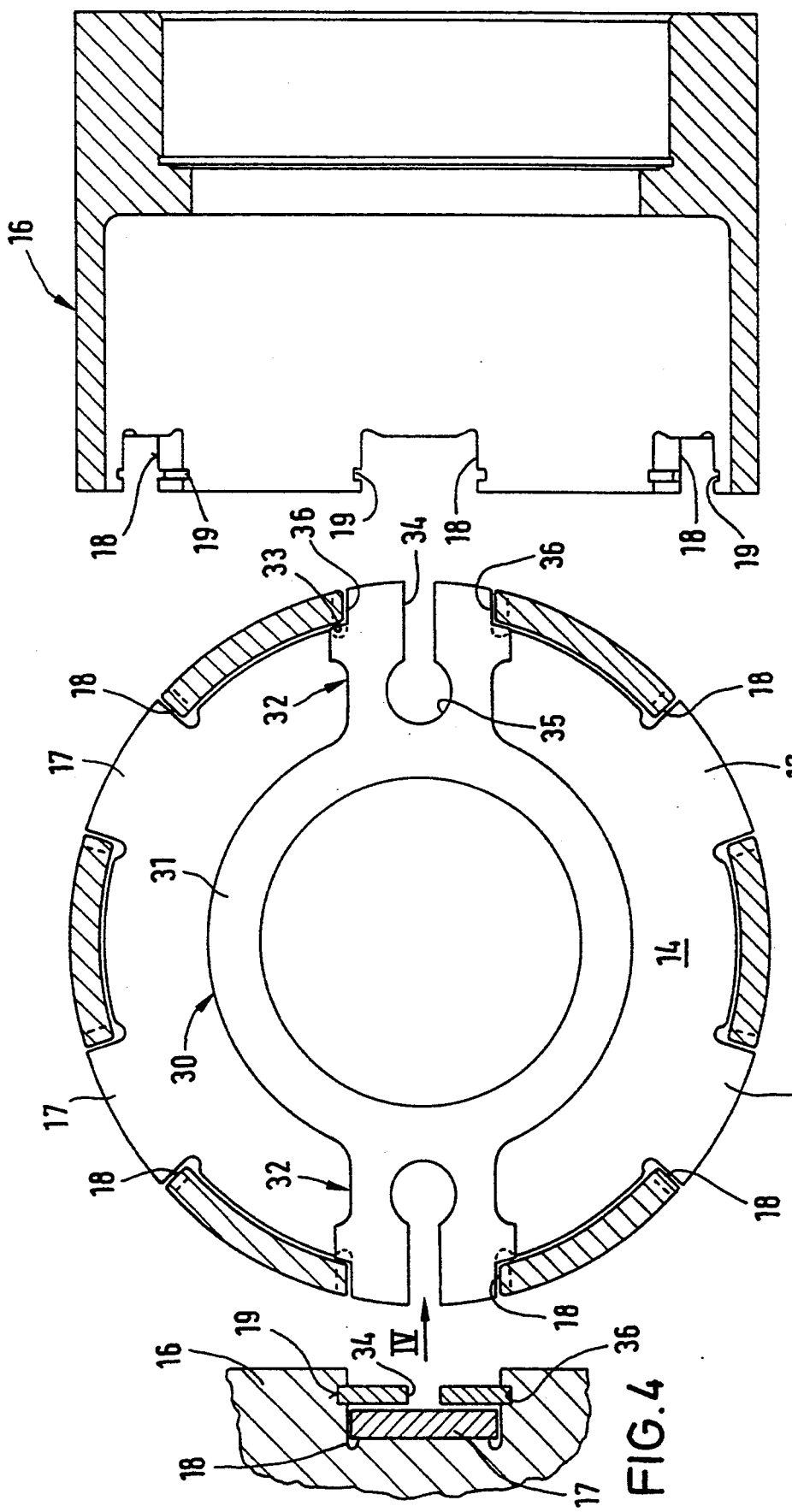

5,370,590

SECURING MEANS FOR A PLANETARY GEAR UNIT

BACKGROUND OF THE INVENTION

1. Field of the Invention

This invention relates to planetary gearing for automotive transmissions. In particular the invention pertains to a connection between a brake drum and planet pinion carrier of a planetary gearset.

2. Description of the Prior Art

In a planetary gear unit having at least one set of planet pinions and a drum member surrounding them, the planet carrier, which carries the planet pinions rotatably mounted on planet gear spindles, includes a larger diameter disc member with which it is drivingly connected to the open end of the drum member by way of a projection and recess connection. This connection is axially fixed by a securing element.

Securing means of this kind for a connection between a planetary gear unit and a drum member is known from German Offenlegungsschrift 21 24 009, wherein the drum member forms an inner drum to accommodate a multiplate clutch fitted to it. One part of a planetary gear unit is provided on its outer circumference with a tooth system and engages on the drum member in a corresponding tooth system, which also accommodates the lugs of the clutch plates. The connection is secured by stops and offsets formed by bending down the drum member, as shown in FIG. 5 of said German specification.

From German Offenlegungsschrift 22 27 555, in particular FIG. 1B thereof, a connection for a planetary gear unit comprising a planet gear set surrounded by a drum member is known wherein the drum member forms a brake drum for a brake band passing round it. A part of a planet carrier is provided on its outer circumference with a plurality of radial projections, which project into axial recesses in the open end of the drum member. The connection is made by a retaining ring snapped into an annular groove formed on the inside of the drum member.

Production of this annular groove is made relatively difficult and expensive by the axial recesses located at the free end of the drum member. Furthermore, adjacent the planet carrier and an adjoining component of the gear unit there is an axial thrust washer or an axial needle bearing, which in one known form has to be fitted onto the planet carrier.

SUMMARY OF THE INVENTION

It is an object of this invention to provide an improved means for securing a connection between a planetary gear unit and a drum member, of the kind referred to above, such that the difficult production of an internal annular groove in the drum member is eliminated and a suitable arrangement of the necessary adjacent axial bearing is produced.

According to the invention this object is achieved by forming the securing element as a ring adjacent to the larger diameter disc member, said ring having at least two and preferably three, pairs of spreading arms extending radially into the recesses in the drum member, and forming undercuts in the recesses at the end of the drum member in front of the plane of the disc member, said radial spreading arms being such that the end parts of their edges are engageable into undercuts in the circumferential direction by plastic or elastic deformation.

By circumferential engagement of the side edges of the radial arms of such a securing element into the undercuts, which may be in the form of grooves in the recesses in the end of the drum member, the planetary gear unit can be reliably secured to the drum member, and an axial bearing can, if required, be fitted to the ring.

If the radial spreading arms formed on the ring are separated by a radial slit with a rounded end, plastic deformation into the undercuts in the circumferential direction can be effected by means of a suitable wedging tool.

If the radial spreading arms formed on the ring are carried on inclined bridging elements and arcuate bows extending from the ring of the securing element, locking of the side edges of the spreading arms into the recesses in the drum member in the circumferential direction can be effected in an elastic manner, so that disassembly is possible.

If an axial thrust washer is fixed to the inner ring of the securing element by adhesion, plating or clamping, it is simple to realize a centered arrangement of an axial bearing if this is required.

BRIEF DESCRIPTION OF THE DRAWINGS

The invention will now be described by way of example with reference to embodiments shown in the accompanying drawings.

FIG. 2 is a vertical cross section through the drum member.

FIG. 3 is a front view of the drum member, disc member of the plant carrier, and securing element direction of arrow IV in FIG. 3.

FIG. 4 is a view of the connection taken in the

DESCRIPTION OF THE PREFERRED EMBODIMENT

Figure 1:
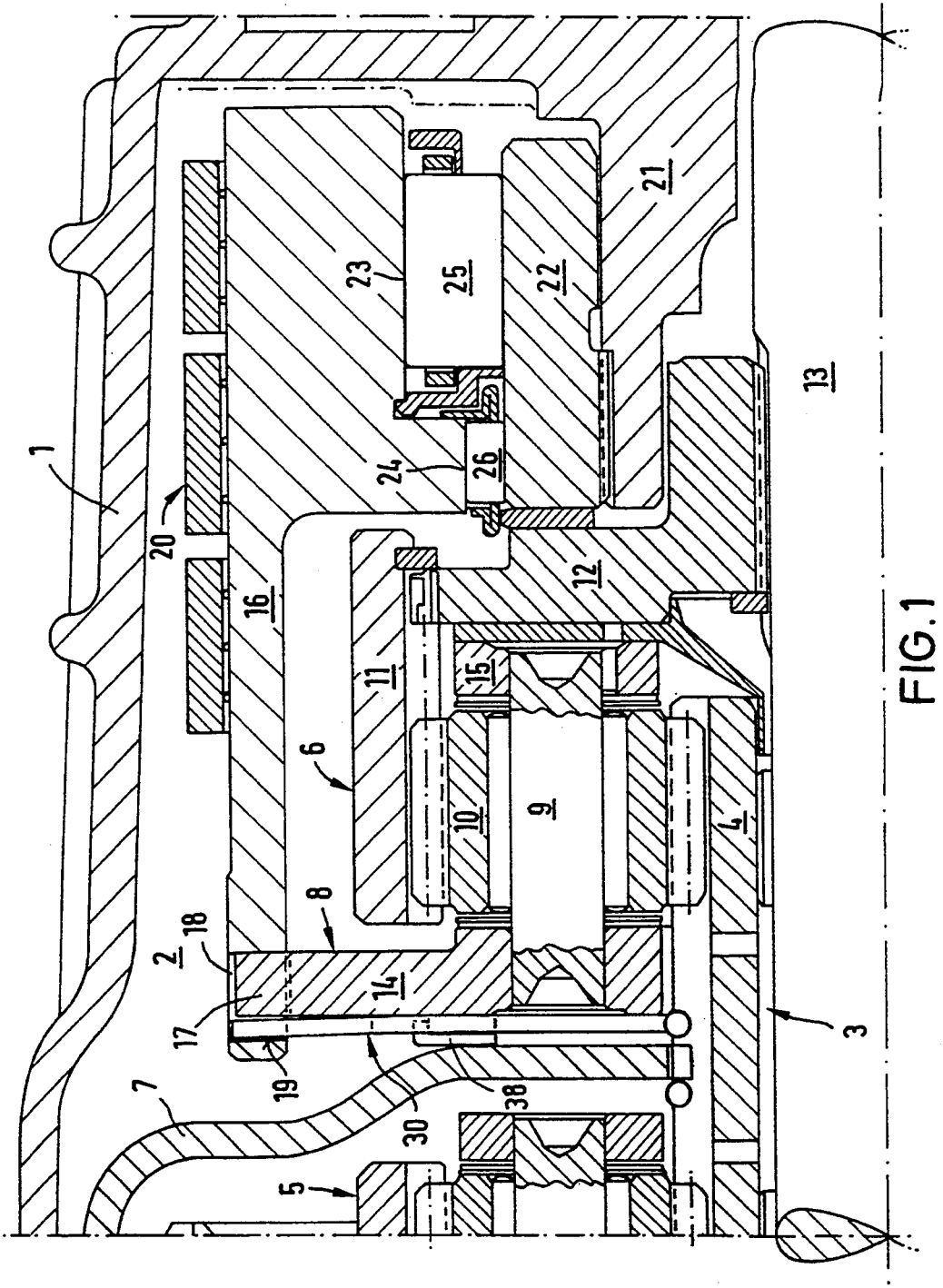
FIG. 1 is a vertical cross section through part of an automatic transmission for a motor vehicle taken in the region of a planetary gear unit that is surrounded by a drum member.

In FIG. 1 a planetary change-speed gear in the form of a Simpson train 3, arranged in the space 2 at the rear of a gearbox housing 1, includes a common sun wheel 4, first planet gear set 5 and second planet gear set 6.

Driving torque is transmitted from a preselector planet gear set (not shown) to an intermediate shaft that drives a clutch carrier on which two multiplate clutches are arranged, the common sun wheel 4 of the Simpson train 3 driven by one of the clutches via a cup-shaped drum member 7.

The second planet gear set 6 of the Simpson train 3 consists of a planet carrier 8 having planet pinions 10, rotatably supported on planet gear spindles 9, these pinions engaged on one side with sun wheel 4 and, on the other side, with a ring gear 11, which is driveably connected with the output shaft 13 of the gearbox by way of a hub part 12.

The planet carrier 8 consists essentially of a disk member 14 and a cage member 15, which accommodate the planet pinions 10 on the planet gear spindle 9 in known manner. The planetary gear unit 6 is surrounded by a brake drum 16 driveably connected to the planet carrier 8 by way of projection 17 on the disk member 14 of the planet carrier 8 and recess 18 on the free end of the brake drum 16. A brake band 20, which engages with the outer surface of the brake drum 16, prevents rotation of the planet carrier 8 in either direction.

The gear box housing 1 has an axial projection 21, which carries an inner race 22 of a combined overrunning clutch and radial bearing 25/26.

The drum member 16 is provided at its closed end with internal track surfaces 23 and 24 for an overrunning clutch 25 and a radial bearing 26, respectively.

The overrunning clutch 25 makes it possible to prevent rotation of the planet carrier 8 in one direction, whereas the planet carrier 8 can be prevented from rotating in either direction by means of the brake band 20.

The form of the securing element 30, and the way in which it works, are explained next in more detail with reference to FIGS. 2-4.

As can be seen from FIGS. 2 and 3, the drum member 16 is provided at its free end with a number of axial recesses 18, into which projections 17 of the disc member 14 of the planet carrier 8, shown in FIG. 3, project.

According to the invention recesses 18 are provided with grooves 19 located in front of the plane of the disc member 14.

The securing element 30 consists of an inner ring 31 having, in this embodiment, two pairs of spreading arms 32 having lateral centering shoulders 33 adapted to the inner surface of the drum member 16 and having edges radially outer ends called fingers 36 projecting into the recesses 18 in the drum member 16. In this embodiment the spreading arms 32 of each pair are separated by a radial slit 34 that ends in a rounded hole 35.

As best seen in FIG. 4, the projections 17 of the disk member 14 of the planet carrier 8 are fitted into the recesses 18 of the drum member 16, the spreading arms 32 of the securing element 30 are then inserted into the recesses 18, and by the action of a wedging tool inserted into slit 34, the end edges 36 of the spreading arms 32 are forced into grooves 19 in the recesses 18. Securing of the connection between the drum member and the planet carrier is thereby effected, and an axial bearing unit in the form of an axial thrust washer or an axial needle bearing can be fitted, if required, on the face of the inner ring 31 of the securing element.

Figure 5:
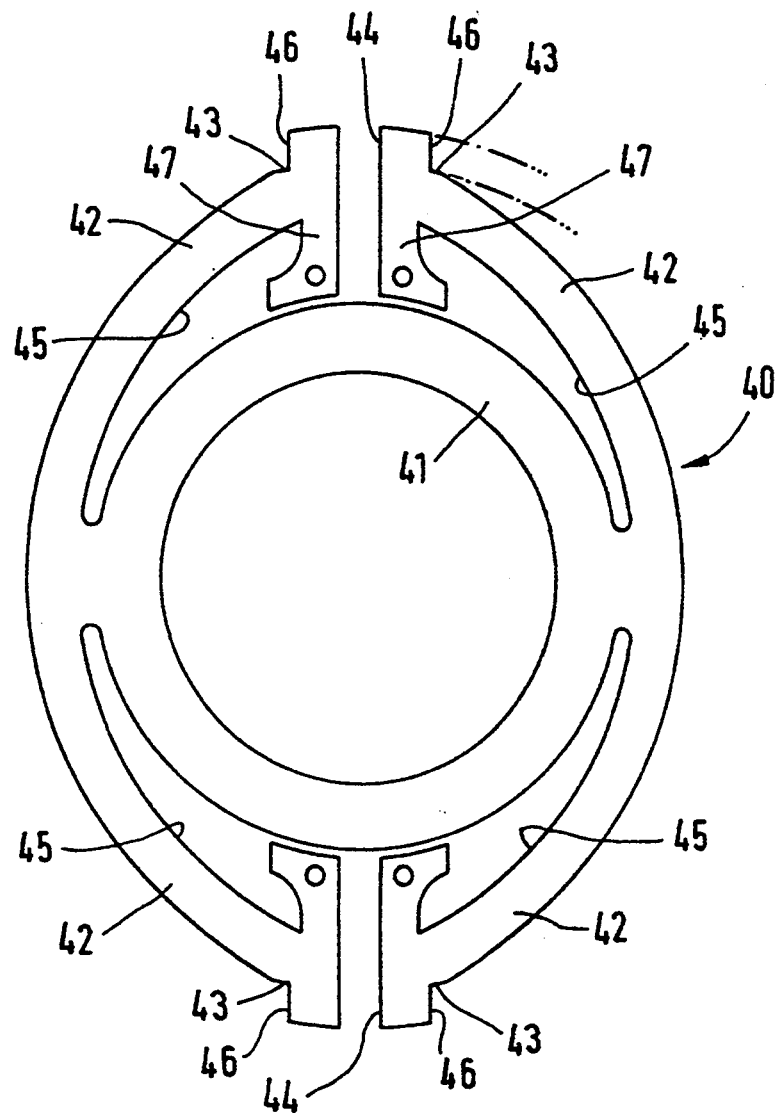
FIG. 5 is a front view of an embodiment of a securing element.

The securing element 40 shown in FIG. 5 again comprises an inner ring 41 and two pairs of spreading arms 42 having centering shoulders 43. In this case, however, the spreading arms 42 do not extend from the radially closest region of the inner ring 41, but from a side region thereof, so that a radial slit 44 is formed and the spreading arms 42 are given a bow shape through crescent-shaped cutouts 45, so that they are elastically deformable in the circumferential direction. Opposite the end parts 46 of the edges of the spreading arms 42 there are inwardly extending projections 47, which can be grasped by a suitable tong tool in order to lock and unlock the end edges 46 of the spreading arms 42 in the undercuts 19 of the recesses 18.

An axial bearing can be fitted on the inner ring 41 of the securing element 40 if required, thus giving rise to a very wide variety of possibilities. For example, a bronze running layer can be applied on the inner ring 41 by adhesion, plating or the like, or a separate thrust washer 38 can be clamped fast by bending down tongues on the outer or inner circumferences.

In a similar manner an axle needle bearing can be fastened and centered on the inner ring 41.

What is claimed is:

1. A device for connecting components of the gearing and control elements of an automatic transmission, comprising:
    a planetary gear set including a sun gear, ring gear, planet pinions meshing with the ring gear and sun gear, and a carrier rotatably supporting the planet pinions having an arm extending radially;
    a brake drum having recesses spaced mutually about the axis of the drum, each recess formed with grooves, the arm of the carrier located in said recesses; and
    an element for securing the carrier to the brake drum, comprising a ring located adjacent the carrier, arms extending radially from the ring, the radially outer end of each arm formed with a finger located in one of said recesses, the finger of each arm adapted to engage the corresponding groove by elastic displacement of the arms.

2. The device of claim 1 wherein the fingers of pairs of said arms are separated by a radially extending slit, the pairs of arms being displaceable with respect to the ring.

3. The device of claim 1 wherein each recess has lateral surfaces located at circumferentially opposite sides of the recess, each lateral surface being formed with one of said grooves facing and aligned with another of said grooves on the opposite lateral surface, each finger located in a groove.

4. The device of claim 2 wherein each recess has lateral surfaces located at circumferentially opposite sides of the recess, each lateral surface being formed with one of said grooves facing and aligned with another of said grooves on the opposite lateral surface, each finger located in a groove.

5. A device for connecting components of the gearing and control elements of an automatic transmission, comprising:
    a planetary gear set including a sun gear, ring gear, planet pinions meshing with the ring gear and sun gear, and a carrier rotatably supporting the planet pinions having an arm extending radially;
    a brake drum having recesses spaced mutually about the axis of the drum, each recess formed with grooves, the arm of the carrier located in said recesses; and
    an element for securing the carrier to the brake drum, comprising
    a substantially circular ring located adjacent the carrier;
    arms connected to the ring, extending angularly and radially outward from the ring, the radially outer end of each arm formed with a finger located in one of said recesses; and
    each finger located adjacent a finger on an arm of a pair of arms, the fingers of each pair of arms adapted to engage the corresponding grooves by displacement of the arms.

6. The device of claim 5 wherein the fingers of pairs of said arms are separated by a radially extending slit, the pairs of arms being displaceable angularly with respect to the ring.

7. The device of claim 5 wherein each recess has lateral surfaces located at circumferentially opposite sides of the recess, each lateral surface being formed with one of said grooves facing and aligned with a another of said grooves on the opposite lateral surface, each finger located in a groove.

8. The device of claim 6 wherein each recess has lateral surfaces located at circumferentially opposite sides of the recess, each lateral surface being formed with one of said grooves facing and aligned with another of said grooves on the opposite lateral surface, each finger located in a groove.

* * * * *